United States Patent [19]

Bolt

[11] 3,978,233
[45] Aug. 31, 1976

[54] LIQUID WARMER

[76] Inventor: Alex W. Bolt, 1408 Richmond Ave., No. 255, Houston, Tex. 77006

[22] Filed: Sept. 16, 1974

[21] Appl. No.: 506,252

[52] U.S. Cl. .................................. 426/115; 99/295; 215/13 R; 215/100 R; 219/432
[51] Int. Cl.² ........................................ B65D 23/12
[58] Field of Search ........... 426/106, 107, 109, 110, 426/112–115, 120, 131, 234, 394, 397; 215/12 A, 13 R, DIG. 7, 100 R; 99/289, 290, 295, 296, 300, 304, 323, 302 A; 219/432, 433, 438, 535; 222/553

[56] References Cited
UNITED STATES PATENTS

| | | | |
|---|---|---|---|
| 896,903 | 8/1908 | Ferry | 215/DIG. 7 X |
| 959,110 | 5/1910 | Buck | 99/302 R |
| 1,944,495 | 1/1934 | Collins | 219/438 X |
| 2,543,581 | 2/1951 | Koski | 215/13 R X |
| 2,682,358 | 6/1954 | Vitale | 222/553 X |
| 2,909,305 | 10/1959 | Opsitnik | 215/13 R X |
| 3,261,504 | 7/1966 | Sabaka | 222/553 X |
| 3,275,448 | 9/1966 | Sommer | 426/106 X |
| 3,327,881 | 6/1967 | Maier | 215/13 R X |
| 3,453,947 | 7/1969 | George et al. | 219/433 X |
| 3,845,873 | 11/1974 | Bridges | 215/13 R |

Primary Examiner—Frank W. Lutter
Assistant Examiner—William Cuchlinski, Jr.
Attorney, Agent, or Firm—Kenneth H. Johnson

[57] ABSTRACT

A portable hot liquid system comprising a container with the bottom portion of the insulated cover being removable to form a cup, a heating holder adapted to receive the uncovered bottom portion of the container and a small vessel for holding a soluble condiment, which is adapted to attach onto the nozzle of the container, so that the hot liquid, for example, water can be passed through the small condiment vessel, thereby dissolving the condiment and producing hot food or beverage.

12 Claims, 9 Drawing Figures

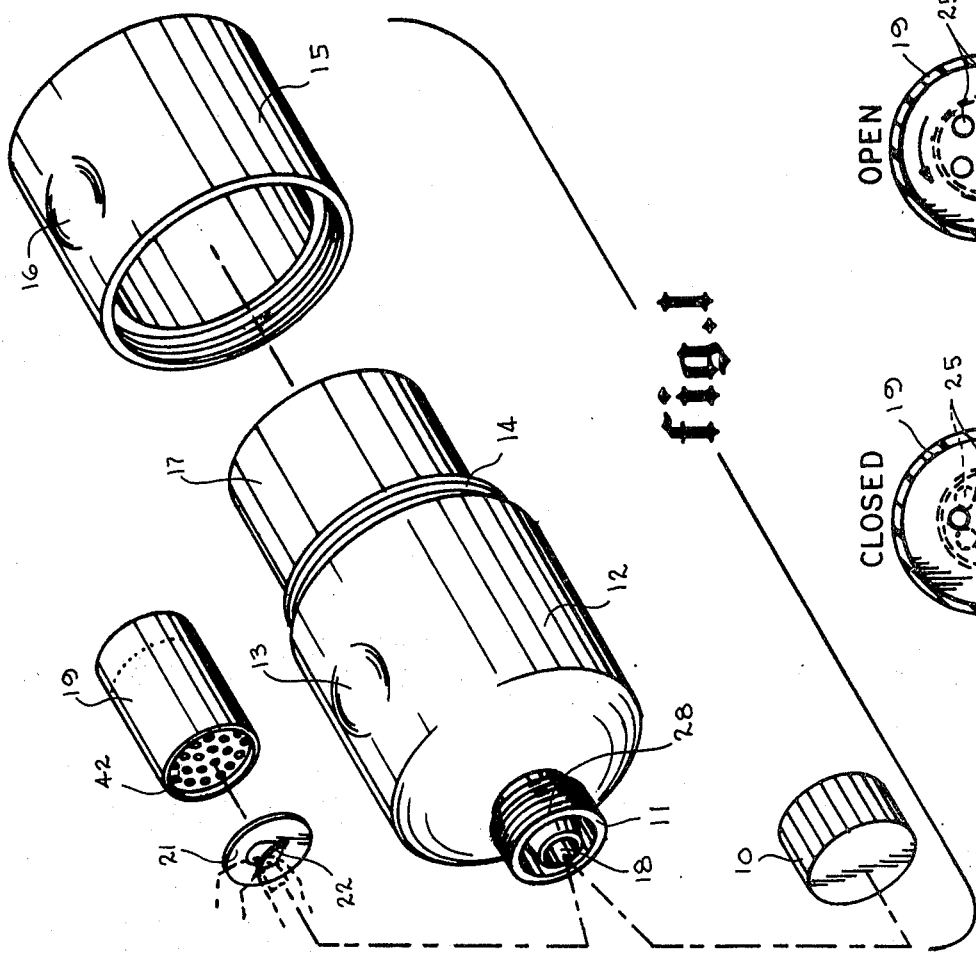
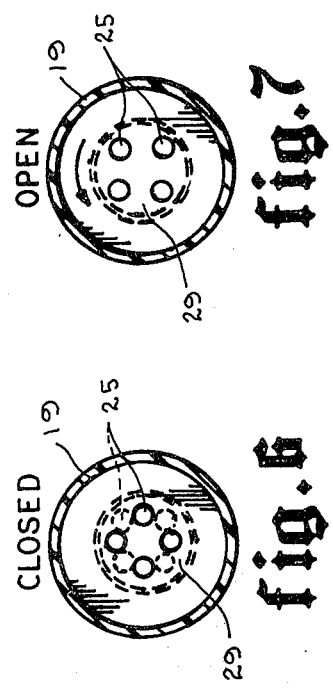
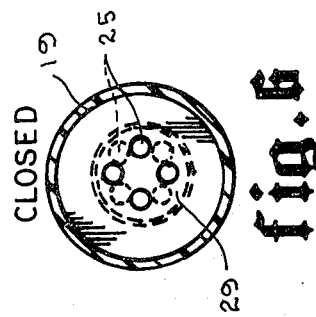
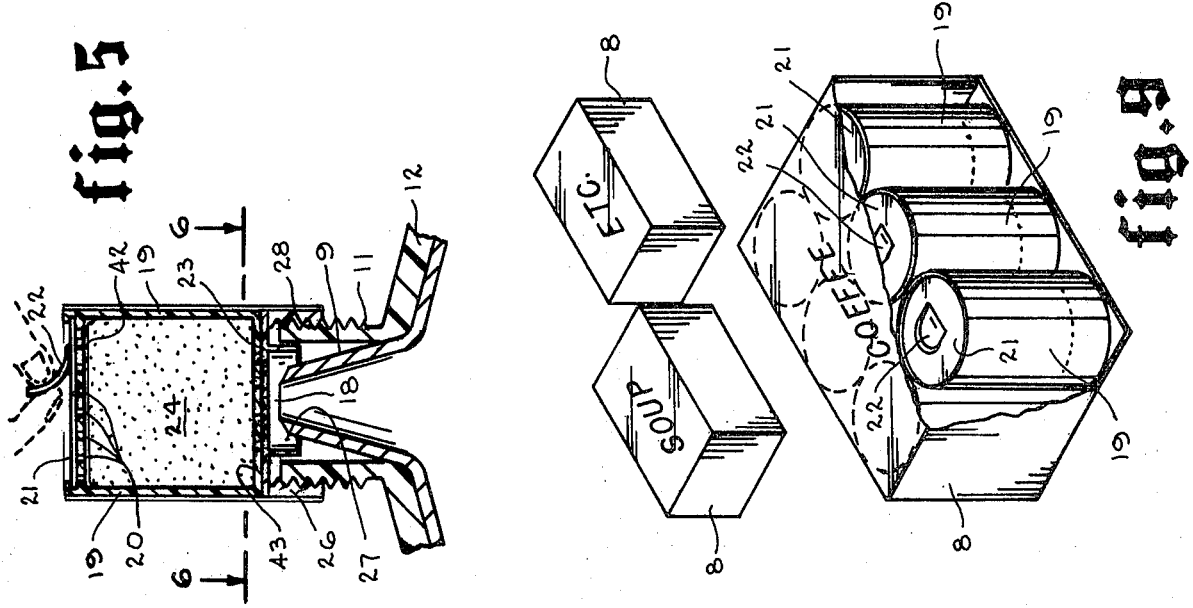

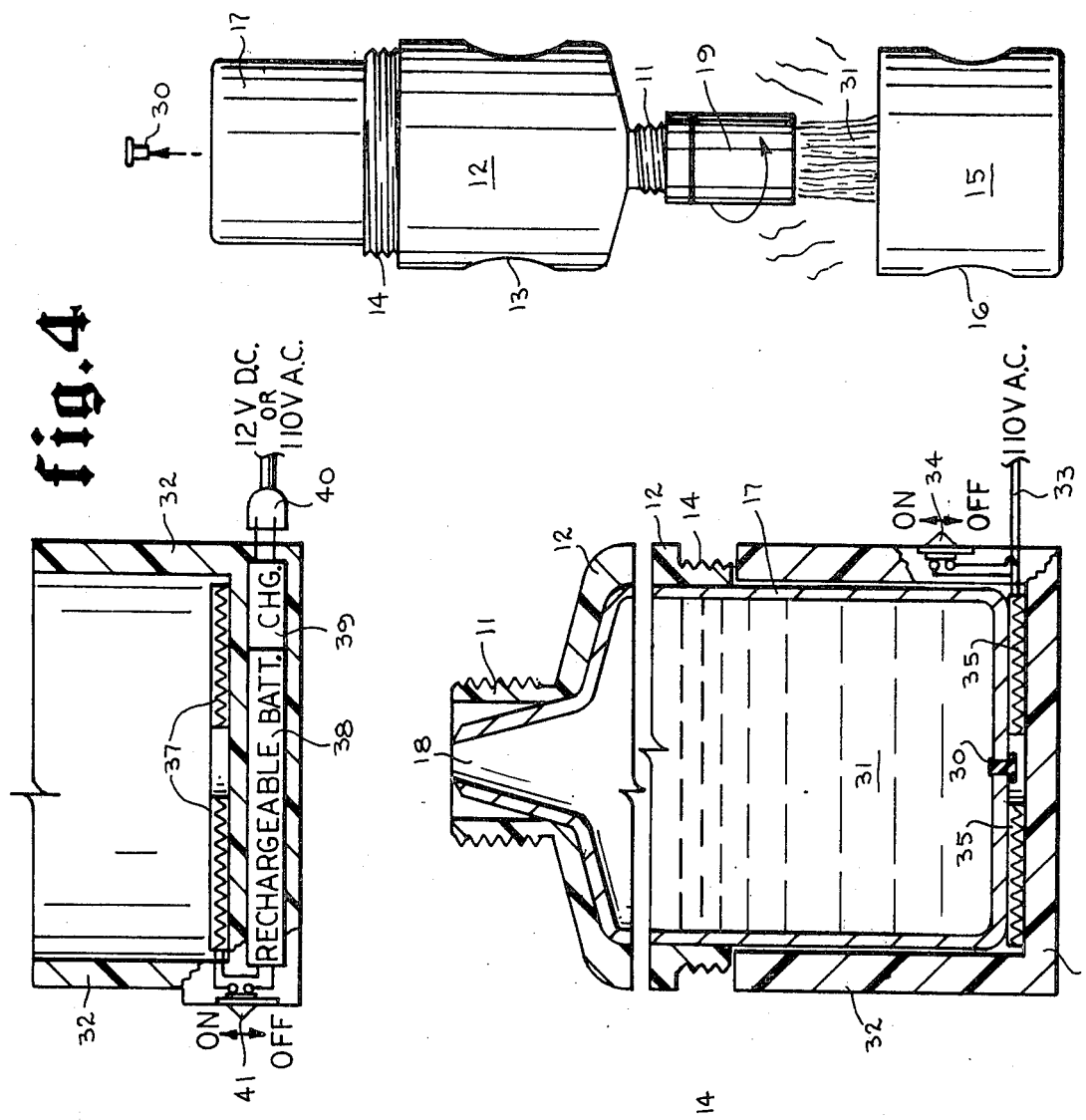
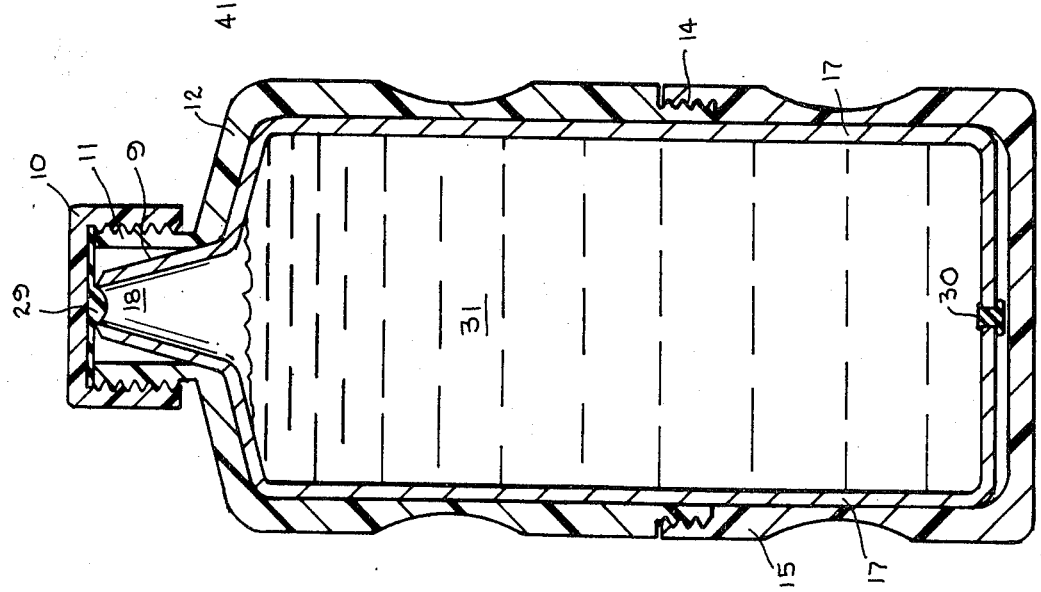

LIQUID WARMER

BACKGROUND OF THE INVENTION

The present invention relates to a self contained portable system for preparing and dispensing hot liquids.

Insulated containers are commonly employed to make hot or cold liquids portable. The use of a thermos bottle for transporting a hot liquid, however, does have a serious drawback, wherein the liquid must be hot when it is placed in the thermos. In usual practice a hot liquid such as soup, tea or coffee is placed in a container with selection of the condiment in the hot water being made hours before the use or need therefor, hence if soup is prepared and some hours later, coffee is desired, there is no way to conveniently change the selection.

One could carry hot water in the container, and portions of various condiments to be desolved therein. It is a feature of the present invention that a system is provided which will carry a liquid and which will conveniently allow a condiment or material to be dissolved therein. It is another feature of an embodiment of the present invention that the liquid may be heated or reheated in the system. It is an advantage of the present invention that a portable selection of water soluble condiments may be employed in the system. These and other features and advantages will become apparent from the following discussion and description of the drawings and embodiments therein.

SUMMARY OF THE INVENTION

Briefly the present invention is a system for providing hot liquid comprising a liquid container having a thermally insulating cover thereon, said cover having a neck, the lower portion of said cover forming a detachable cup, and a detachable tubular container mountable on said neck for containing a soluble condiment. The system also includes a holder having a heating element therein, for receiving the uncovered lower portion of said container therein. Liquid in the container may be preheated to the desired temperature or may be heated in one embodiment by the heating element while in the container. The liquid may be water. A soluble material such as instant coffee or bouillon may be contained in the detachable tubular container. The hot drink is prepared by allowing the heated water to flow through the tubular container and dissolve the soluble material therein. Thus one container of hot water may be used to prepare several types of hot drinks.

DRAWINGS

FIG. 1 is an isometric view of all of the elements of the present invention.

FIG. 2 is cross sectional elevation of one embodiment of the present invention.

FIG. 3 is a cross sectional elevation of an alternate embodiment having a heating element.

FIG. 4 is partial cross sectional elevation of battery operated heating element.

FIG. 5 is a cross sectional detail of a spout and soluble condiment container in operational association.

FIG. 6 is bottom view of the condiment container along 6 — 6 of FIG. 5 in the "closed" configuration.

FIG. 7 is the same view as FIG. 6 in in the "open" configuration.

FIG. 8 is an elevational view of the system of the present invention in operation.

FIG. 9 is several isometric views of packages of soluble condiments.

DETAILED DESCRIPTION AND PREFERRED EMBODIMENTS

Referring to FIG. 1 all of the elements of the system of the present invention are shown in their relative placement for cooperative operation. A container 17 is situated within an upper insulated cover 12 and a lower insulated cover 15 which forms a cup. The lower cover 15 is engaged to the upper portion of cover 12 by threads 14, forming a totally insulated surface over container 17. Depressions 13 and 16 on the upper and lower covers respectively, provide points for gripping the covers by hand.

At one end of the container 17 is a neck 9 having opening 18 therein into the container. About neck 9 is a neck 11 projecting from the cover 12 having threads 28 thereon for receiving cap 10 or tubular container 19. The tubular container 19 with perforated closure 42 which is covered with cover 21 prior to use and which is removed by pulling tab 22 is adapted to removably engage threads 28 on neck 11.

Referring now to FIG. 5 the details of the cooperative association of the tubular container 19 and opening 18 and neck 9 of container 17 and cover 12 can be seen. The tubular container 19 is tightly seated on neck 11 by threads 28 and 26 respectively. On the end of the tubular container 19 adjacent to the opening 18, the container 19 is closed with a perforated closure 43. Situated between the opening 18 and closure 45 is a rotatable cover 23. Attached to cover 23 is annular collar 27 which extends around neck 9 and inside of neck 11. Within tubular container 19 is a soluble material which shall be described as condiments herein, said term shall be used in its broadest sense as a substance added to water to add flavor thereto, such as coffee, bouillon, tea, and various artificial flavorings. At the opposite end of the tubular container, furtherest from the end seated on neck 11 is a perforated closure 42 with openings 20 therein and cover 21. The neck 9 has a funnel or frusto conical shape.

The operation of the closure 25 and cover 23 can be seen from FIGS. 6 and 7. FIG. 6 is the closed configuration which is the result of the rotatable cover 23 being set with the openings 25 therein offset from the openings 25 in closure 43. By rotating cover 23, one-eighth of a turn, as shown in FIG. 7, will align openings 25.

FIG. 2 depicts one embodiment of the present invention wherein the container 17 is closed by cap 10. Cover 12 is preferably bonded to container 17, such as by an adhesive. The lower cover 15 is tightly seated on the container 17 by joining cover 12 and cover 15 with threads 14. A plug 30 is located in the bottom of container 17. A liquid 31 such as water is enclosed therein. The liquid may be heated or unheated. The system is closed by cap 10 which contains a resilient seal 29 which is sealed against neck 9, thereby closing opening 18. In this embodiment the system is of the same functionality as a conventional Thermos bottle.

By removing lower cover 15 the container 17 can be set into the holder 32 of the system as shown in FIG. 3. Located in holder 32 is heating element 35 which is connected through switch 34 to electrical cord 33 for connection to a 110 volt AC outlet (not shown). The container 17 is perferably a heat conducting material, such that by activation of heating element 35, a liquid 31 within contain 17 is heated.

An alternate form of the holder 32 is shown in FIG. 4 wherein a heating element 37 is connected through switch 41 to rechangeable battery 38, which is connected to charger 39. Charger 39 is adapted to operate from either 12 volt DC or 110 volt AC current through electrical connection 40. The heating element may also be a catalytic type chemical heater.

Referring now to FIG. 8 the system of the present invention is shown in a typical use for preparing a hot food or beverage. Lower cover 15 has been removed and is serving as a cup into which a hot liquid containing a dissolved condiment from tubular container 19 is passing. Container 17 is inverted to that gravity will cause the hot liquid therein to flow from the container 17 through tubular container 19 which is threaded onto neck 11, thereby dissolving some portion of the soluble material therein. Plug 30 may be extracted at this time to allow a faster flow of the liquid from container 17.

FIG. 9 shows a method of providing a convenient selection of the tubular containers 19, containing premeasured amounts of various water soluble foods stuffs or beverages. As depicted in FIG. 9 in the cut away view six tubular containers 19 each with cover 21 in place and in the closed configuration of FIG. 6 (not shown) are contained in package 8. Each container 19 in a package could contain the same condiment or each package could contain a mixed group of condiments.

The components of the present system have been described in cooperative combination with the other components of the system. Some suggestion of the variations contemplated as within the scope of the invention have been made, there are other obvious and conventional modifications of the elements of the system which are likewise considered to be within the scope of the present invention.

The invention claimed is:

1. A portable hot liquid system comprising a single container said container being a heat conducting material and having a necked opening at one end thereof, and an insulated cover over the surface thereof said insulated cover having a top section adjacent to said necked opening, fixedly attached to said container and having a threaded neck extending around said necked opening of said container, and a bottom cup section engaging said top section and being removably mounted on said container said container having an opening which has a removable resilient plug therein, located adjacent to the cup section of said cover said opening being within the insulated cover when said cup section is engaged to said top section.

2. The system according to claim 1 wherein a cap is removably engaged on said threaded neck of said top section and in sealing engagement with said necked opening.

3. The system according to claim 2 wherein a resilient seal is juxtaposed between said cap and said necked opening.

4. The system according to claim 2 wherein said top section and said bottom section are engaged by threads.

5. The system according to claim 1 wherein a tubular container having a perforated closure on each end thereof is removable engaged at one end on said threaded neck of said top section.

6. The system according to claim 5 wherein each of said perforated closures has an openable cover associated therewith.

7. The system according to claim 6 wherein said cover adjacent to necked opening has openings therein which are rotatably alignable with said perforations in said closure.

8. The system according to claim 7 wherein the cover on the tubular container opposite said rotatable cover is removable.

9. The system according to claim 5 wherein said tubular container contains a water soluble food stuff.

10. The system according to claim 1 wherein said container is removably seated in a holder having a heating element therein.

11. The system according to claim 10 wherein said bottom cup section is removed from said container.

12. The system according to claim 10 wherein said heating element is electrically operated.

* * * * *